United States Patent [19]

Carboniero et al.

[11] Patent Number: 4,824,308

[45] Date of Patent: Apr. 25, 1989

[54] SEPARATING AND LIFTING DEVICE FOR STACKED-UP FLAT ELEMENTS

[75] Inventors: Flavio Carboniero; Aldo Pontini, both of Schio, Italy

[73] Assignee: Omera Spa, Schio, Italy

[21] Appl. No.: 79,115

[22] Filed: Jul. 29, 1987

[30] Foreign Application Priority Data

Jul. 29, 1986 [IT] Italy ................ 85583 A/86

[51] Int. Cl.⁴ .............................................. B65H 3/50
[52] U.S. Cl. ..................... 414/797; 271/105; 414/797.1; 414/797.3
[58] Field of Search ............... 414/117, 118, 119, 120, 414/121, 122, 123; 271/105, 106

[56] References Cited

U.S. PATENT DOCUMENTS 4,453,873  6/1984  Curti .................................. 414/120

FOREIGN PATENT DOCUMENTS

| 2313598 | 9/1974 | Fed. Rep. of Germany | 414/120 |
|---|---|---|---|
| 208229 | 3/1968 | U.S.S.R. | 414/120 |
| 620316 | 7/1978 | U.S.S.R. | 414/119 |
| 776974 | 1/1980 | U.S.S.R. | 271/105 |
| 902939 | 3/1982 | U.S.S.R. | 414/118 |

Primary Examiner—Leslie J. Paperner
Attorney, Agent, or Firm—Birch, Stewart, Kolasch & Birch

[57] ABSTRACT

A device for the separation, lifting and removal of complete flat elements includes an open structure, suited to receive in its lower central part a storage for the metal sheets and two lateral stands, each supporting at its lower end a set of rollers leaning against and guiding the metal sheet to be separated and lifted. Further, one of the lateral stands presents under its set of rollers a template which horizontally displaces the top metal sheet of the pile.

The other lateral stand also presents at its lower end the set of rollers and a template, which receives the displaced metal sheet and lifts it from the pile of metal sheets. In one form of execution of the device, each stand is provided with two hydraulic or pneumatic cylinders, one being for the vertical movement and one for the horizontal movement. Another form of execution of the device includes two lateral stands being provided with a single cylinder with a vertical stroke.

13 Claims, 4 Drawing Sheets

SEPARATING AND LIFTING DEVICE FOR STACKED-UP FLAT ELEMENTS

BACKGROUND OF THE INVENTION

1. Field of the Invention

The invention concerns a device for the separation of flat elements, such as for instance blanked discs, to be lifted one at a time and removed for subsequent operations.

2. Description of Related Art

Some separating devices are known, which are connected with lifting devices acting on flat elements stacked in piles on an underlying storage surface. The simplest lifting devices foresee an element of contact with the piece to be lifted, which acts with a pre-determined and adjustable force. For instance, in the case of non-stainless steel sheets the pre-determined lifting force consists of a suitably dimensioned magnet, inserted in the mechanical lifting arm. On the other hand, in the case of non-magnetic materials, such as stainless steel or brass, the drawing is done by means of a sucker acting by depression. In this case too, by varying the vacuum percentage within the sucker, the lifting force can be increased and gauged to lift pre-determined weights.

It is obvious that, as soon as the adhesion conditions between one flat element and the next one in the pile to be drawn from vary, the efforts necessary to separate and lift each individual element from the others change. This happens for instance when the oil left from preceding operations dries up and acts as an actual adhesive between one metal sheet and the next. Other variable elements are rust or even the blanking burrs.

All these elements contribute to making extremely variable the effort necessary for the sucker or the magnet to separate and lift a single piece. Thus it happens that, since the lifting strength exerted by the sucker or the magnet must necessarily be higher than the weight of one piece, very often two pieces, rather than one, are lifted at the same time. If two pieces are lifted together and put inadvertently under a blanking or drawing die, the die may break and/or the presses carrying the die may undergo serious damage.

For this reason the known technique has striven to achieve a certain degree of certainty in the lifting of each single piece by performing, for instance, an exfoliation of the pieces stacked in a pile beforehand, the pile presenting toothed bars arranged on diameters which are smaller than the diameters of the pieces, so that the pieces themselves, usually in the shape of discs, separate from each other.

This system yields satisfactory results for some types of metal sheets, but it finds its limit of application when the thickness of the metal sheet exceeds 6-7 tenths of a millimeter and its diameter is larger than 300-350 mm. In fact, when these limits are exceeded, the exfoliation of the metal sheets by bending is no longer practical because of the metal sheet resistance. Other methods of separation exist, based for instance on the vibration of the entire pile, but they also present a considerable degree of uncertainty, as well as of complexity.

OBJECTS AND SUMMARY OF INVENTION

The main purpose of this invention is that of obtaining a separating device giving an absolute certainty of separating and therefore lifting each individual piece, regardless of the thickness of the metal sheet, of its size, of the type of material and of the conditions of preservation of the stacked up metal sheets.

Another object of this invention is that the separating system be not only reliable, but also very simple and independent from the flatness condition of the pile of metal sheets.

A still further object of the present invention is that the device be easy to use, requiring little or no maintenance and be economical.

All of the above mentioned objects, and others which will be better explained hereafter, are achieved with the construction of a device including a supporting frame, in which there is a structure being open at its lower central part, so as to lodge the table for the storage of the metal sheet pile, and two lateral stands, each carrying at its lower end a carrier receiving the metal sheets to be separated and guiding them. Each stand presents also a template for the separation and the lifting off of the metal sheets, characterized by the fact that the separation of each metal sheet is done by its horizontal displacement and the vertical lifting of one of its corners from the underlying metal sheet, said movements being operated horizontally by a gauged template which is fixed on the underside of the set of rollers being lodged at the lower end of one of the lateral stands, and vertically by a gauged template also being lodged at the lower end of the opposite stand forming the device. According to the invention, at the beginning of the working cycle, the two lateral stands of the device are lowered until the sets of rollers incorporated in the slides, which are supported by said stands, come to rest against the top metal sheet of the pile, which is the sheet to be separated and lifted off. At this point, the set of rollers supporting the separating template moves horizontally and pushes laterally by means of the template a single metal sheet, since the template is fixed in a position, which is lower in relation to the set of rollers, by a distance corresponding to the thickness of the sheet to be separated.

On the other stand, the template which operates the lifting off of the metal sheet segment, is always positioned at a higher level than the sheet to be lifted, although this distance is only slightly larger than the thickness of the metal sheet, so that the segment of sheet which has been moved horizontally, comes into contact, with its upper surface, with the lifting template.

The next movement of the device is that of moving upwards the template, which has lifted the corner of the metal sheet, while the set of rollers of the other stand continues to rest against the laterally displaced metal sheet. Thus, the metal sheet separates completely from the underlying metal sheet belonging to the pile. At this point, an arm carrying a magnet or a sucker can lift the entirely separated metal sheet. The cycle is concluded when the templates, together with the sets of rollers, return to their initial position.

One of the advantages of the device is represented by the fact that it does not take into account the flatness of the metal sheets to be separated from the pile. In fact, the sets of rollers incorporated in the stands of the device always rest against each individual sheet to be separated and lifted, and this occurs even if the metal sheet is not perfectly flat.

Another advantage resides in the fact that, since the gauging of the thickness is in relation to a fixed mechanical master gauge, the device does not need to be equipped with proximity sensors or with delicate devices, which would increase the need for maintenance.

BRIEF DESCRIPTION OF THE DRAWINGS

Other characteristics and advantages of the invention will be better understood from the description of two preferred forms of execution of the invention, given by way of example only, but which are not meant to limit the scope of the invention itself, such as it is described and illustrated in the enclosed tables of drawing, wherein.

DETAILED DESCRIPTION OF PREFERRED EMBODIMENTS

Figure 1:
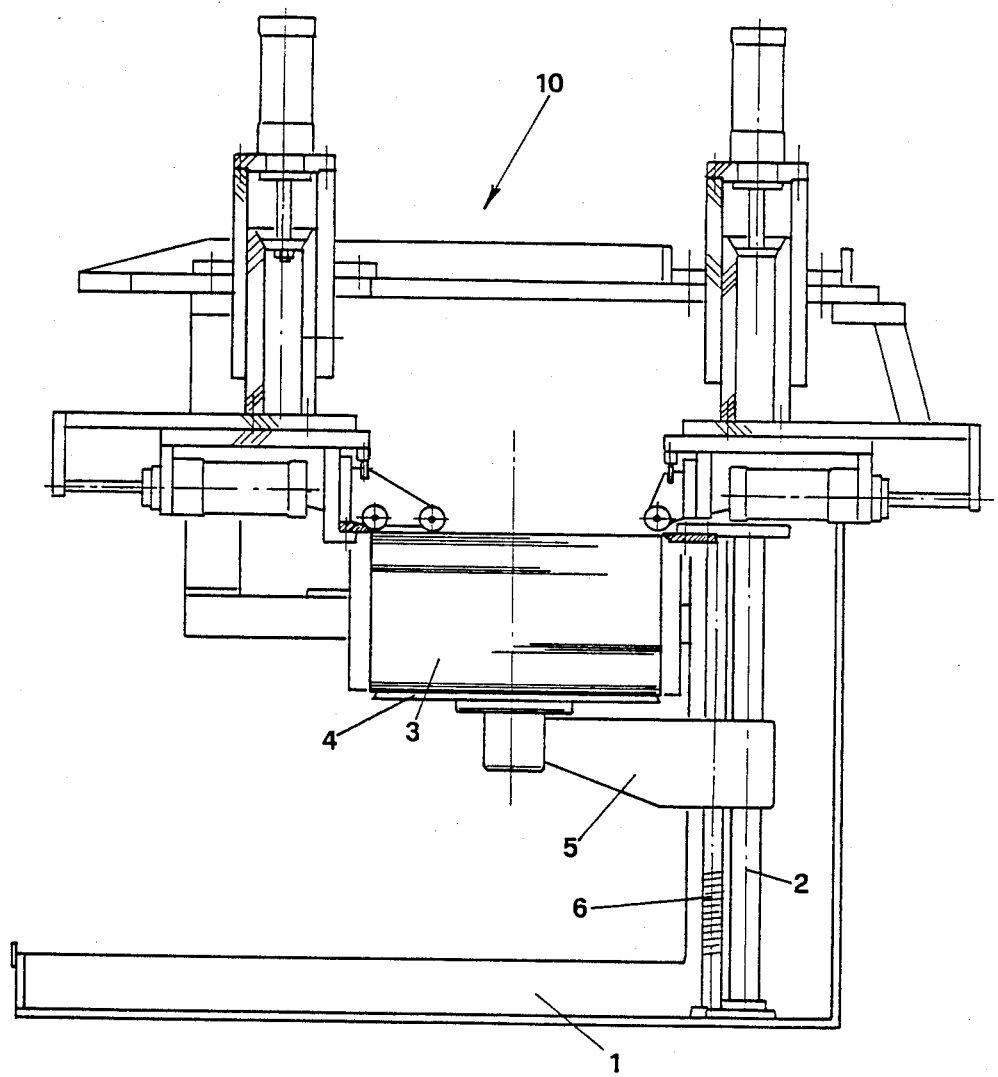
FIG. 1 represents the separating and lifting device fed from a storage shelf.

With reference to the mentioned figures, the device according to the present invention is mounted on a metal structure, consisting essentially of a supporting base 1 and of a stand 2. The metal structure is suited to receive the pile of metal sheets 3, which is lifted by a platform being mounted at the end of a shelf 5 which moves vertically under the driving force of the rotating screw 6 being guided by stand 2. A driving device of a known type (which therefore is not described in detail) causes pile 3 to move gradually upwards as the metal sheets are separated and removed by the automatic transferring arm.

The separating and lifting device, indicated as a whole at 10, is supported by a structure consisting of steel plates connected with stand 2. Two tube-shaped elements 12 and 13 are fastened on the upper horizontal steel plate.

Element 12 is fixed to steel plate 11 with bolts by means of a flange 14. The upper end of the tube-shaped element 12 presents a pneumatic cylinder 15 having a stem 16, which in turn is connected with yet another cylinder 17, which can slide within the tube-shaped element 12. The lower edge of cylinder 17 is bolted by means of a series of bolts 18 to a horizontal plate 19, which presents a pair of dovetail grooves 20. Slide 21 moves within these grooves. The slide 21 includes two plates 22 and 23, which are welded to it and arranged vertically. The pneumatic cylinder 24 is blocked against plate 22, while plate 23 acts as a support for a set of rollers 25 and for the gauged template 26.

The adjustment of the maximum vertical stroke of stem 16 and, as a consequence, of cylinder 17 is carried out with the help of the eccentric washer 27 which slides within slot 28, while, in actuality, the stroke of cylinder 17 is limited by the fact that the set of rollers 25 rests against the metal sheet pile 3.

The horizontal stroke of slide 21 is driven by the pneumatic cylinder 24, whose stem 29 is blocked at its end against the vertical plate 30, which is rigidly connected with the horizontal plate 19. Template 26 is fixed by means of screws to the horizontal edge 31 of plate 23, while the set of rollers 25 can undergo a vertical adjustment by adjusting screw 33. The difference between the lowest point of template 26 and the lowest point of the set of rollers 25 is kept slightly smaller than the thickness of the metal sheet to be lifted, in order for template 26 to push laterally only one sheet at a time, as will be seen further on.

What has been described concerning the set of rollers 25 and template 26 applies also to the movement of a set of rollers 34 and lifting template 35.

In fact, the pneumatic cylinder 36 moves, with its stem 37, a cylinder 38 which slides within the tube-shaped element 13. The horizontal plate 39 is rigidly connected with cylinder 38 and it also supports slide 40 which is made to move horizontally by the pnuematic cylinder 41. In this case, too, the relative position between the set of rollers 34 and the template 35 is adjusted by means of a screw 41. The difference between the lowest point of template 35 and the lowest point of the set of rollers 34, in this case, is slightly greater than the thickness of the metal sheet to be lifted. In fact, as will be pointed out further on, the separated metal sheet can rest on top of template 35 without being hindered by any obstacle.

Figure 3:
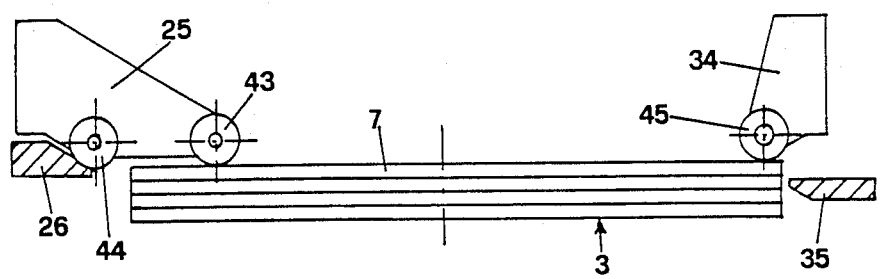
FIGS. 3, 4, 5 and 6 show the sequence of the various operation stages of the device according to the invention.

The coordinated movements of the device according to the invention which allow the separation and the lifting of the metal sheets are as follows. As can be observed in FIG. 3, the set of rollers 25 and 34, which are driven by the cylinders 15 and 36 respectively, are vertically lowered until they come to rest against the pile 3 of metal sheets to be separated and removed.

During this stage, the set of rollers 25 rests only with its roller 43 against pile 3, while roller 44 keeps clear of the pile. The pressure exerted by the two sets of rollers by means of the rollers 43 and 45 is adjustable and it obviously depends on the pushing force of the pneumatic cylinders 15 and 36.

The purpose of this pressure is that of flattening as much as possible the metal sheet to be removed.

Figure 4:
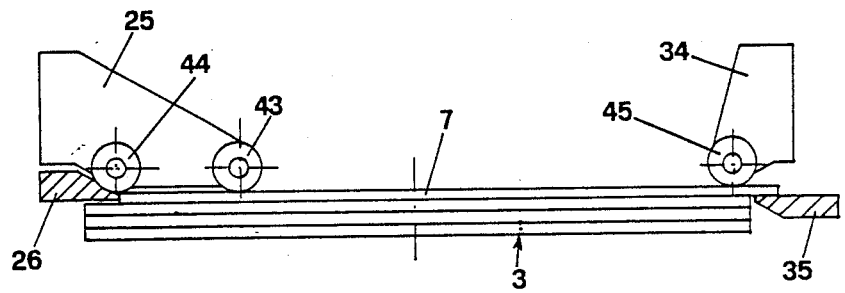
Figure 5:
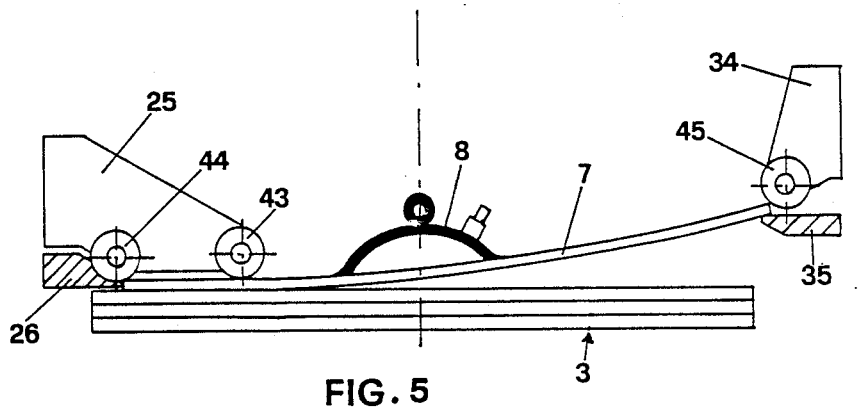
Figure 6:
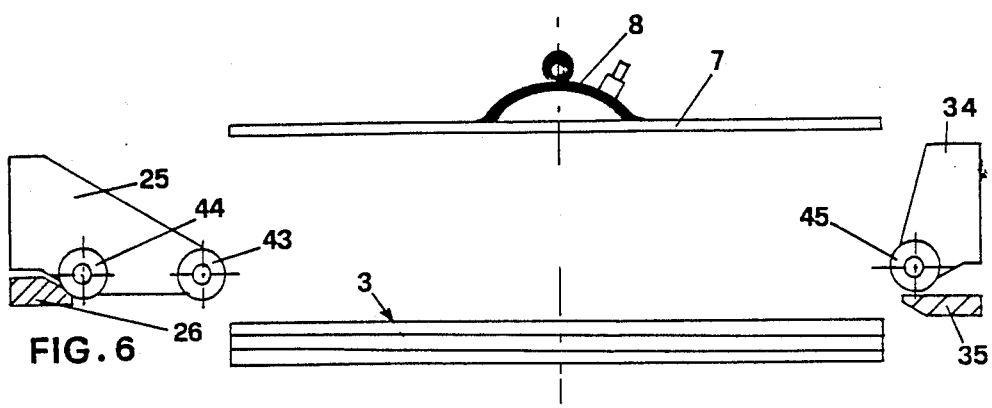

Afterwards, the pneumatic cylinder 24, which causes plate 23 to move toward pile 3, is activated. As a consequence, template 26 leans against the thickness of the metal sheet 7 of the pile, which is the metal sheet to be separated and lifted off, and it causes this metal sheet 7 to be displaced on its horizontal plane, so that a portion of the metal sheet itself comes to rest on the lateral template 35 as can be observed in FIG. 4.

At this point it is necessary to point out that the separation which has just taken place can only concern a single metal sheet. Ih fact, the actual controls of the thickness are two: the first one concerns template 26 being positioned, in relation to the plane of rollers 43 and 44 of set of rollers 25, at a distance which is smaller than the thickness of the metal sheet, so that only one sheet can be pushed toward the set of rollers 34; and the second control concerns the position of template 35, which is lower, in relation to the lowest point of roller 45 of the set of rollers 34, by a distance which slightly exceeds the thickness of the metal sheet but is always smaller than the compounded thickness of two metal sheets.

After the metal sheet 7 has been displaced laterally by template 26 and pushed on top of template 35, the set of rollers 34 driven by cylinder 41 draws back and, at the same time, template 35, pulled by cylinder 36, moves upward. Thus, the separated metal sheet 7, which is still pressed on one side by set of rollers 25, bends, thereby causing this metal sheet to detach itself from the underlying one, should they be stuck together, although the first one is still held in its position, so as to make easier the lifting off carried out by sucker 8, in the case of the example, or by a magnet, in other cases.

The lifting of metal sheet 7 and, therefore, the upward movement of template 35 is adjustable by adjusting the stroke of stem 37 of cylinder 36. The adjustment is necessary since it is important to lift the metal sheet 7 by a distance sufficient to detach the separated metal sheet from the underlying metal sheet. When sucker 8 has securely gripped the metal sheet, the set of rollers 25 draws back with a horizontal movement, and it exists from the surface of pile 3. At the same time it moves upward, so as to completely free the area for the lifting off of the metal sheet 7, which can thus be definitely removed by sucker 8.

According to a different form of execution of the separating and lifting device being the object of the present invention, the vertical and horizontal movements of the sets of rollers and of the templates are obtained in a simplified form, in that the use of a single hydraulic or pneumatic cylinder is foreseen for each group or set of rollers/template. The single cylinder produces both the necessary vertical and horizontal movements with the help of a suitable mechanical unit.

Figure 7:
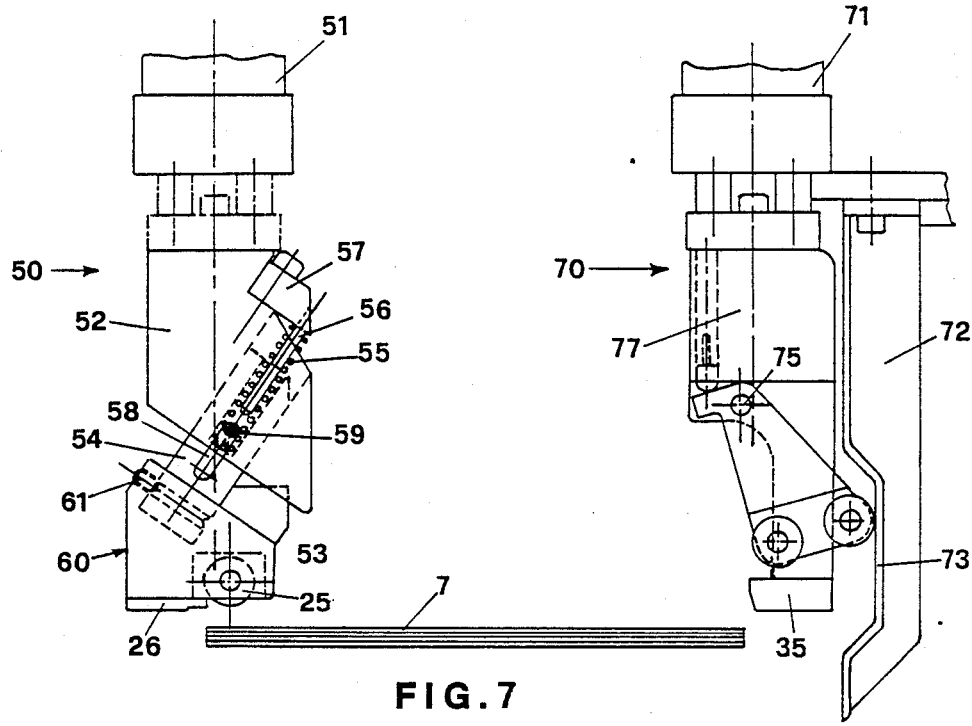
FIGS. 7 and 8 show two successive operation stages concerning a different form of construction of the stand carrying the separating template and of the stand carrying the lifting template.
Figure 8:
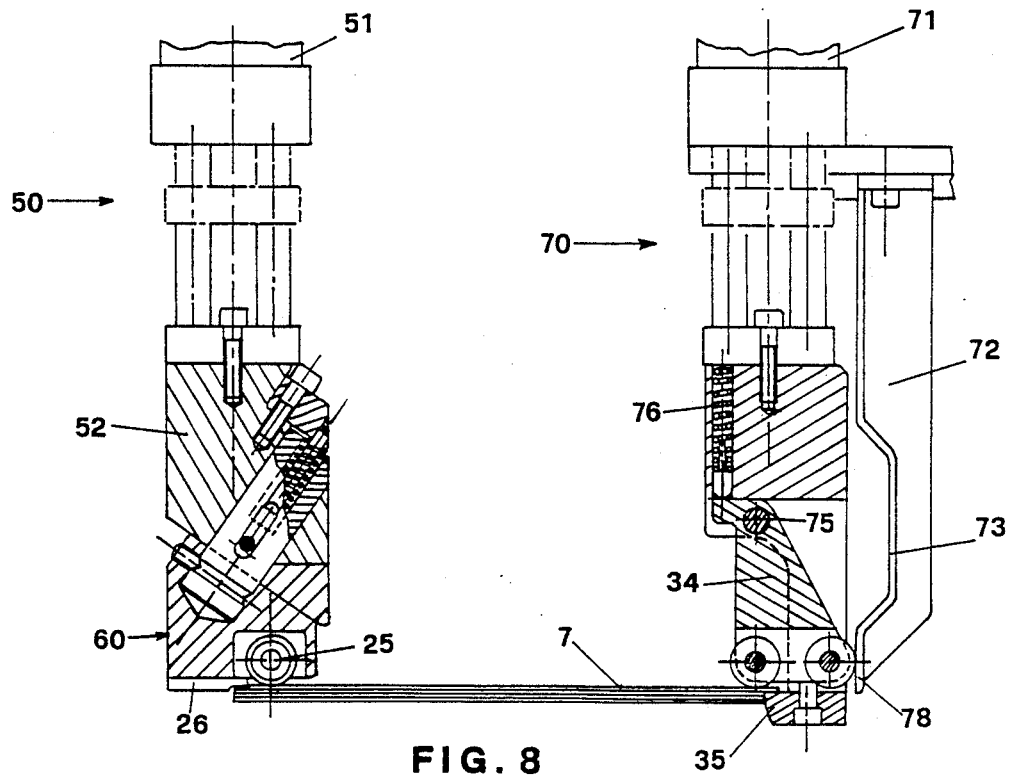

In fact, with reference to the FIGS. 7 and 8, it can be observed that the unit on the left side, indicated as a whole at 50, presents in its upper part a single pneumatic or hydraulic cylinder 51, whose stem, adequately guided, is rigidly connected with the lower part 52 of the stand. This lower part 52 presents at its bottom an inclined surface 53. Perpendicularly to this surface there is a pivot 54 which is free to slide within its seat and is kept protruding downwards by a spring 55 whose seat is within a cavity which is coaxial with the pivot 54. Spring 55 is guided by a cylindrical stick 56 which is fastened to a little block 52, which in turn is rigidly connected to post 52. The sliding movement of pivot 54 is limited by slot 58, into which a pin 59 is inserted. The pin 59 prevents the rotation of pivot 54 and its sliding out of its seat, obtained within the stand 52.

The lower end of pivot 54 is inserted into yet another stand 60 and is blocked within it by means of a headless screw 61.

Stand 60 carries at its lower end the set of rollers 25 and template 26, the mechanical devices which have already been described in the preceding example.

When the piston of 51 is activated, stand 52 is lowered and stand 60 lowers itself with it, so that the set of rollers 25 leans against the metal sheet 7 which is to be separated and lifted. Since the piston of cylinder 51 continues to move downwards, so does stand 52. It thus happens that stand 60, which is already leaning with the set of rollers 25 on the metal sheet 7, moves horizontally, since pivot 54 is forced to re-enter within its seat because of the downward movement of stand 52. Thus the horizontal displacement of metal sheet 7, pushed by template 26 is obtained, as can be observed in FIG. 8.

Figure 2:
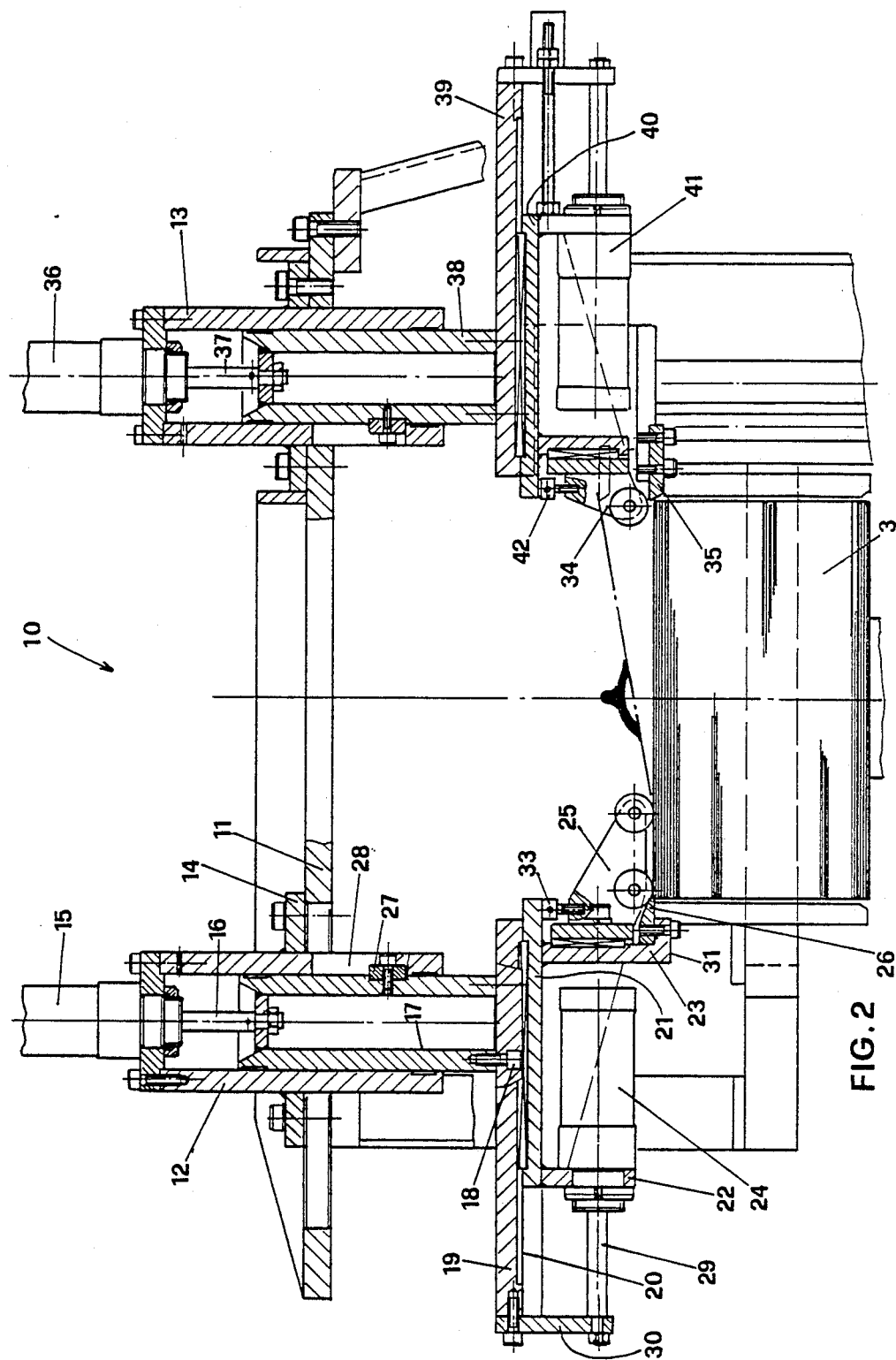
FIG. 2 is a cross sectional view of the device according to the invention.

It must be pointed out that the just described form of execution not only leads to a simplification of construction and to the use of a reduced number of components and of control organs, due to the elimination of the horizontal cylinder 24 represented in the example of FIG. 2, but also makes it possible to obtain a sure synchronization of the movements, which is sure since it is determined by mechanical gauges, rather than by the coordination of electrical, pneumatic or hydraulic controls. In fact, in the execution form represented in FIG. 2, a programmed sequence of controls for the vertical cylinder 15 and the horizontal cylinder 24 is necessary, which is absolutely not necessary for the execution form represented in the FIGS. 7 and 8.

As far as the unit set of rollers/lifting template, which is indicated as a whole at 70 is concerned, it is necessary to point out that the set of rollers 34 needs to rest against the metal sheet 7 to be lifted and that it is important that it keeps on resting against the metal sheet during the separation procedure operated by template 26.

After the separation of the metal sheet has taken place, for the subsequent lifting, which is done by the template 35, it is necessary for the set of rollers to draw back and stay outside of the vertical line passing through the edge of metal sheet 7, so as to allow the removal of the separated metal sheet by means of sucker 8, or equivalent devices.

In the example illustrated in FIGS. 7 and 8 it can be observed that the horizontal translation operated by the set of rollers 35, which in the example of FIG. 2 is operated by cylinder 41, is changed into a rotation, which obtains the same operational result, which in actuality is that of positioning the set of rollers outside of the range of movement of the separated metal sheet 7.

The rotation is achieved by positioning a fixed cam 72 near a cylinder 71 which is suitably shaped in its part 73. The set of rollers 34 is hinged at 75 and is constantly under the stress of spring 76, so that the set of rollers positions itself as shown in FIG. 7, when the piston of cylinder 71 is pulled upwards. On the other hand, when the operation of separating the metal sheet 7 is under way, as can be observed in FIG. 8, the downward pushing force of the piston of cylinder 71 brings, first of all, template 35, being ridigly connected with stand 77, to a position suited to receive the metal sheet 7, so that the set of rollers 34 straightens up in a vertical position and leans against the metal sheet 7, since edge 78 of cam 72 forces the set of rollers to take the vertical position.

In this case, it has also been seen how cylinder 41 can be done away with, and this brings about a further simplification of the lifting unit with the ensuing savings in the construction process and also an absolute precision in the synchronization of the movements.

As has been seen, the device according to the invention has reached all the proposed goals. In fact, it has been seen that the instant device guarantees the removal of a single metal sheet, since the separating device is based on a separating template with a fixed gauge in relation to the thickness of the metal sheet.

It has also been observed that the mechanical device does not require special proximity sensors or other delicate and costly mechanisms.

Obviously, during the manufacturing process, construction variations can be introduced in the just described device, which variations will not exceed the scope of the patent rights, such as they are described and defined in the following claims.

We claim:

1. A device for the separation and removal of flat elements such as metal sheets stacked in a pile, said device comprising:
    an open supporting frame having a lower central portion for receiving a plurality of metal sheets and having two opposing lateral stands positioned on two opposing sides, respectively, of said pile;
    first and second roller means provided at inner ends of said two lateral stands, respectively, for leaning on and guiding one metal sheet of said plurality of metal sheets;

first template means, provided below said first roller means, for horizontally displacing said one metal sheet;

second template means, provided below said second roller means, for lifting a segment of said one metal sheet subsequent to horizontal displacement by said first template means; and means for removing said horizontally displaced and lifted one metal sheet from the remaining ones of said plurality of metal sheets;

whereby a successive separation of each one of said plurality of metal sheets is by horizontal displacement by said first template means and by subsequent lifting by said second template means.

2. The device according to claim 1, wherein said means for removing is a sucker device.

3. The device according to claim 1, wherein said means for removing is a magnetic device.

4. The device according to claim 1, wherein said second template means lifts said one of said plurality of metal sheets subsequent to said first template means performing said separation, said first and second template means first lowering said first and second roller means of said two lateral stands whereby said first and second roller means lean against said plurality of metal sheets to be selected and removed, said first template means subsequently horizontally displacing said first roller means toward said plurality of metal sheets, said first template means being for displacing a single metal sheet of said plurality of metal sheets and said second template means being for lifting said single metal sheet subsequent to displacing by said first template means, said second set of roller means being positioned on top of said second template means, said first and second template means sequentially withdrawing said first roller means, respectively, from said plurality of metal sheets subsequent to said lifting of said single metal sheet by said second template means.

5. The device according to claim 1, wherein prior to horizontal displacement by said first template means, both said first and second roller means are leaned against said plurality of metal sheets and wherein subsequent to lifting by said second template means said second roller means are withdrawn from said plurality of metal sheets and wherein subsequent to withdrawal of said second roller means said first roller means are withdrawn from said plurality of metal sheets.

6. The device according to claim 1, wherein said first template means is positioned below said first roller means by a distance less than or equal to the thickness of said one metal sheet, and wherein said second template means is positioned below said second roller means by a distance slightly greater than the thickness of said one metal sheet.

7. The device according to claim 1, further including both vertical and horizontal cylinder means for controlling the movement of said first and second template means.

8. The device according to claim 7, wherein said vertical and horizontal cylinder means include hydraulic cylinders.

9. The device according to claim 7, wherein said vertical and horizontal cylinder means include pneumatic cylinders.

10. The device according to claim 1, further including adjustment means for vertically adjusting the distance between said first roller means and said first template means and for vertically adjusting the distance between said second roller means and said second template means.

11. The device according to claim 10, wherein said means for adjusting is a screw provided for each said roller means.

12. The device according to claim 7, wherein said first roller means and said first template means are driven by a single cylinder means which vertically moves a vertical stand ending at its bottom with an inclined surface being connected by means of a sliding pivot to another vertical stand also ending at the top with an inclined surface, said inclined surfaces being parallel to each other, said lower vertical stand being provided with a set of rollers and a template which move horizontally when the upper stand moves vertically due to the action of said single cylinder being connected with said upper stand.

13. The device according to claim 12, further including a second set of rollers and template which act as a unit to lift a separated metal sheet, said unit being driven by a single cylinder which vertically moves a vertical stand supporting the second set of rollers and template, said rollers being rotatable around a hinge arranged horizontally on the vertical stand and being constantly under the pushing stress of a spring member which pushes said rollers at an angle in relation to a vertical line, said rollers during the vertical displacement of the single cylinder, following the profile of a fixed cam so as to be on top of a metal sheet to be separated and so as to be clear of its area of movement when the metal sheet is being removed from a remaining plurality of metal sheets.

* * * * *